(12) United States Patent
Becker et al.

(10) Patent No.: US 9,114,833 B2
(45) Date of Patent: Aug. 25, 2015

(54) SENSOR ASSEMBLY FOR MOTOR VEHICLE STEERING SYSTEMS

(75) Inventors: Ingo Becker, Linnich (DE); Bernd Krueger, Willich (DE)

(73) Assignee: TRW Automotive GmbH, Alfdorf (DE)

( * ) Notice: Subject to any disclaimer, the term of this patent is extended or adjusted under 35 U.S.C. 154(b) by 6 days.

(21) Appl. No.: 13/697,641

(22) PCT Filed: May 13, 2011

(86) PCT No.: PCT/EP2011/002375
§ 371 (c)(1),
(2), (4) Date: Jan. 25, 2013

(87) PCT Pub. No.: WO2011/141179
PCT Pub. Date: Nov. 17, 2011

(65) Prior Publication Data
US 2013/0205917 A1    Aug. 15, 2013

(30) Foreign Application Priority Data
May 14, 2010  (DE) .................. 10 2010 020 599

(51) Int. Cl.
| | |
|---|---|
| G01L 3/00 | (2006.01) |
| B62D 15/02 | (2006.01) |
| G01B 7/30 | (2006.01) |
| B62D 6/10 | (2006.01) |
| G01L 5/22 | (2006.01) |

(52) U.S. Cl.
CPC .............. B62D 15/021 (2013.01); B62D 6/10 (2013.01); B62D 15/0215 (2013.01); G01B 7/30 (2013.01); G01L 5/221 (2013.01)

(58) Field of Classification Search
CPC .......... G01B 7/30; G01L 3/10; G01L 3/1457; B62D 5/04; B62D 15/02
USPC ............. 73/862.191, 862.331–862.338
See application file for complete search history.

(56) References Cited

U.S. PATENT DOCUMENTS

| | | | |
|---|---|---|---|
| 6,761,075 B2 * | 7/2004 | Steinlechner et al. ... | 73/862.326 |
| 6,804,888 B2 * | 10/2004 | Nishikawa et al. ........... | 33/1 PT |
| 6,935,193 B2 * | 8/2005 | Heisenberg et al. ..... | 73/862.324 |

(Continued)

FOREIGN PATENT DOCUMENTS

| | | |
|---|---|---|
| DE | 19816568 A1 | 11/1999 |
| DE | 10254751 A1 | 9/2003 |

(Continued)

OTHER PUBLICATIONS

International Search Report for PCT/EP2011/002375 dated Jul. 21, 2011.

(Continued)

*Primary Examiner* — Lisa Caputo
*Assistant Examiner* — Octavia Hollington
(74) *Attorney, Agent, or Firm* — MacMillan, Sobanski & Todd, LLC

(57) ABSTRACT

A sensor assembly for motor vehicle steering systems, having a torque sensor for magnetically determining a steering torque, and a rotational angle sensor for magnetically determining an absolute steering angle, precisely one carrier member being provided which has a magnetic coding for determining the steering torque and the absolute steering angle and which is shared by the torque sensor and the rotational angle sensor.

8 Claims, 2 Drawing Sheets

(56) References Cited

U.S. PATENT DOCUMENTS

| | | | |
|---|---|---|---|
| 7,028,545 | B2 | 4/2006 | Gandel et al. |
| 7,671,583 | B2 | 3/2010 | Diegel et al. |
| 8,024,956 | B2 | 9/2011 | Hammerschmidt et al. |
| 8,087,306 | B2 | 1/2012 | Goll et al. |
| 8,286,507 | B2 * | 10/2012 | Bastian et al. ........... 73/862.325 |
| 2006/0123903 | A1 | 6/2006 | Gandel et al. |

FOREIGN PATENT DOCUMENTS

| | | |
|---|---|---|
| DE | 60200499 T2 | 5/2005 |
| DE | 102004020149 A1 | 11/2005 |
| DE | 102005031806 A1 | 1/2007 |
| DE | 102007059361 A1 | 9/2008 |
| DE | 102009038256 A1 | 4/2010 |
| DE | 102009046997 A1 | 5/2011 |
| EP | 1238891 A1 | 9/2002 |
| EP | 1925533 A1 | 5/2008 |
| WO | 2007006742 A1 | 1/2007 |
| WO | 2008043421 A2 | 4/2008 |
| WO | 2008068334 A1 | 6/2008 |
| WO | 2008068339 A1 | 6/2008 |

OTHER PUBLICATIONS

German Search Report, Application No. 102010020599.0, dated Apr. 30, 2014.

Chinese Office Action, Application No. 201180031329.9, dated Jul. 30, 2014.

Paper entitled "A Method of Measuring Angle by Using Hall Sensor" in Electro-Mechanical Engineering, Aug. 25, 2001, Total No. 92, No. 4, pp. 1-2.

* cited by examiner

SENSOR ASSEMBLY FOR MOTOR VEHICLE STEERING SYSTEMS

CROSS-REFERENCE TO RELATED APPLICATIONS

This application is a national stage of International Application No. PCT/EP2011/002375 filed May 13, 2011, the disclosures of which are incorporated herein by reference in entirety, and which claimed priority to German Patent Application No. DE 10 2010 020 599.0 filed May 14, 2010, the disclosures of which are incorporated herein by reference in entirety.

BACKGROUND OF THE INVENTION

The present invention relates to a sensor assembly for motor vehicle steering systems, having a torque sensor for magnetically determining a steering torque.

It is common practice nowadays to install sensors into motor vehicle steering systems for determining the steering torque and/or the steering angle, in order to allow steering assist means to be driven, for example.

In connection with the development of electric steering systems, a reliable provision of sensor data about the steering angle and steering torques becomes increasingly more important.

In addition to the fundamental goal of ensuring a high failure safety of the sensor system and therefore of the respective steering system, efforts are also made to design the necessary sensors such as to make them as compact and low-cost as possible, because of cramped spatial conditions in the region of the steering.

DE 602 00 499 T2 and corresponding U.S. Pat. No. 7,028,545 B2, both of which are incorporated by reference herein in entirety, for example, describes a fairly compact position sensor for detecting rotation of a steering column, in which the angles measured are on the order of about 10 degrees and are used for capturing a torque. To determine the torque, merely a tubular magnet yoke is required here, which has a plurality of magnets attached in pairs to the radial outside thereof.

Apart from information relating to the steering torque, information relating to the current steering angle, in particular relating to the absolute steering angle, is also of major importance in vehicle steering systems. Rotary encoders are already described in the prior art which assign a unique encoded positional value to each angular position, so that the absolute rotational angle is also known for a turn of the steering wheel of more than 360 degrees.

BRIEF SUMMARY OF THE INVENTION

It is a feature of the invention to provide a sensor assembly which is as simple and compact as possible and which provides necessary sensor data for motor vehicle steering systems.

According to the invention, this feature is achieved by a sensor assembly for motor vehicle steering systems, including a torque sensor for magnetically determining a steering torque, and a rotational angle sensor for magnetically determining an absolute steering angle, precisely one carrier member being provided which has a magnetic coding for determining the steering torque and the absolute steering angle and which is shared by the torque sensor and the rotational angle sensor. The integration of the torque sensor and the rotational angle sensor into a sensor assembly which includes only one single magnetically coded carrier member, rather than two or three such carrier members as are usual, results in a very compact design of a structurally particularly simple construction, which, in addition, as a result of saving of at least one carrier member with a magnetic coding, is very cost-effective to manufacture.

Particularly preferably, the rotational angle sensor is adapted to measure an angular range within an angular segment. In this connection, an angular segment is understood as that region of the carrier member in which a magnetic pole pair consisting of a north pole and a south pole is arranged. On the basis of a change in the magnetic flux lines it is therefore possible for the rotational angle sensor to detect even very small rotary motions of the carrier member and thereby to determine the absolute steering angle even within a particular angular segment.

In an advantageous further development of the invention, the rotational angle sensor may include a counting means which counts a plurality of angular segments. This means that upon a rotation of the carrier member, the number of angular segments or pole pairs that move past the rotational angle sensor is counted by the counting means. In this connection it should be understood that the size of the respective angular segments arranged on the carrier member or their pitch is already known in advance. The sum of angular segments counted corresponds in a first approximation to an angular interval in which the absolute steering angle is situated. The precise determination of the absolute steering angle is ensured in that the sum of angular segments counted is combined with the angular range measured by the rotational angle sensor within an angular range. As a result, an absolute steering angle can also be determined for turns that are larger than 360 degrees and correspond to a multiple turn of the steering wheel or of the carrier member.

In an advantageous further development of the invention, the counting means is adapted to detect and store a variation in the absolute steering angle also in the de-energized condition. Therefore, information on the currently set absolute steering angle is available to the steering system at all times during vehicle operation, that is, in particular also immediately after the start of the motor vehicle. This requires neither a time-consuming system initialization after the vehicle start nor an uninterrupted, permanent power supply of the sensor assembly.

In an alternative embodiment of the sensor assembly, the counting means may be connected to an electrical energy storage and, consequently, be permanently energized. Since the power consumption of the counting means is very low, the power supply can be easily provided by the vehicle battery when the ignition is off, for example.

Advantageous and expedient configurations of the concept of the invention are described in the dependent claims.

Other advantages of this invention will become apparent to those skilled in the art from the following detailed description of the preferred embodiments, when read in light of the accompanying drawings.

DETAILED DESCRIPTION OF THE INVENTION

Figure 1:
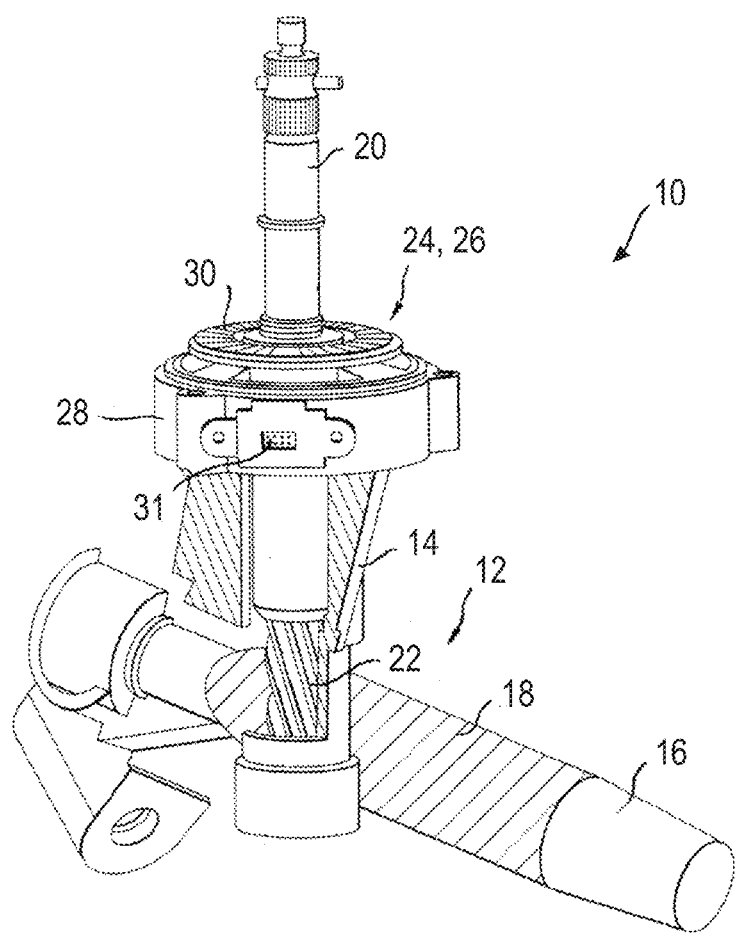
FIG. 1 shows a perspective view of a detail of a motor vehicle steering system with a sensor assembly according to the invention.

FIG. 1 shows a motor vehicle steering system 10 in the region of a steering gear 12. The steering gear 12 comprises a gear casing 14, a toothed rack 16 arranged for displacement therein and having a toothing 18, and a steering shaft 20. The steering shaft 20 includes a pinion toothing 22 intended to engage with the toothing 18 of the toothed rack 16. Both the toothing 18 and the pinion toothing 22 may be formed as helical gearings.

Further mounted to the steering shaft 20 is a sensor assembly 24 having a torque sensor, not shown in more detail, for magnetically determining a steering torque, and a rotational angle sensor 26 (see also FIG. 2) for magnetically determining an absolute steering angle $\alpha$. The sensor assembly 24 further includes a sensor housing 28 and a carrier member 30 having a magnetic coding. The sensor housing 28 is typically attached to the gear casing 14, whereas the carrier member 30 may be mounted to the steering shaft 20 for joint rotation therewith. The carrier member 30 is a rotatable magnet wheel which is provided with at least one pair of poles consisting of north and south poles and preferably includes a plurality of pairs of poles.

The carrier member 30 is typically received inside the sensor housing 28 and is illustrated axially outside the sensor housing 28 in FIG. 1 merely for reasons of greater clarity.

Additionally provided on the sensor housing 28 of the assembly 24 is a plug connector 31 into which a complementary plug connector can engage, so that the sensor assembly 24 can be connected to an electronic control unit (not shown).

While the motor vehicle steering system 10 according to FIG. 1 includes a rack-and-pinion steering as an example, it should be understood that the use of the sensor assembly 24 is not limited to rack-and-pinion steering systems, but it may also be made use of in other motor vehicle steering systems 10.

The special feature of the invention now resides in that on the basis of the torque sensor, a sensor assembly 24 with an integrated rotational angle sensor 26 is provided; for determining the steering torque and the absolute steering angle $\alpha$, the sensor assembly 24 requires only one single carrier member 30 with a magnetic coding, which is shared by the torque sensor and the rotational angle sensor 26. With respect to the rotational angle sensor, this means that a variation in the magnetic field which occurs upon a rotation of the carrier member 30 is suitably detected and read out by this rotational angle sensor 26. With respect to the torque sensor of the sensor assembly 24, reference is explicitly made to DE 602 00 499 T2, which describes, by way of example, a suitable torque sensor for the sensor assembly 24 according to FIG. 1.

Figure 2:
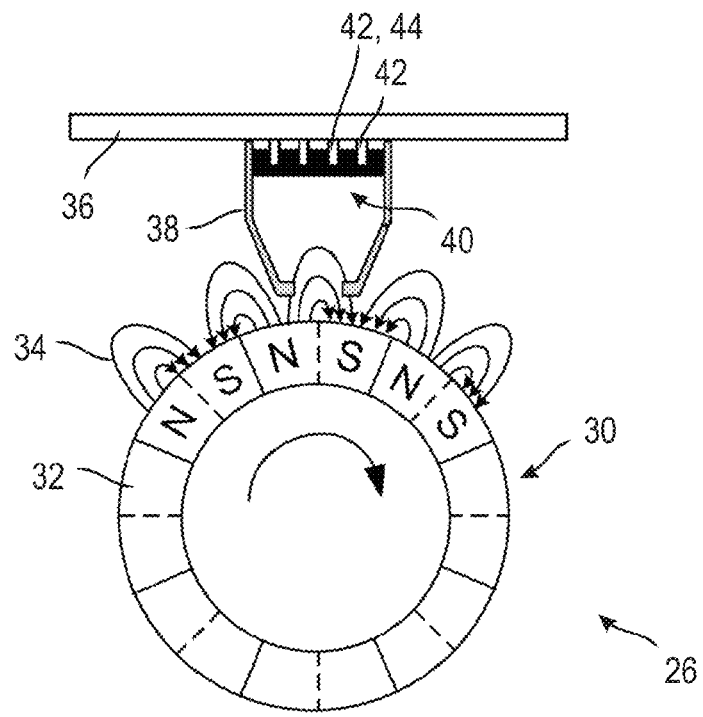
FIG. 2 shows a schematic diagram of a rotational angle sensor integrated in the sensor assembly according to the invention.

FIG. 2 shows the schematic structure of the rotational angle sensor 26 received in the sensor housing 28.

It is clearly visible that in the present case the carrier member 30 with magnetic coding is a rotatable carrier wheel having a plurality of magnets 32 distributed over the circumference or in a ring shape. The magnets 32 are permanent magnets here, which are arranged in the circumferential direction such that north poles and south poles alternately adjoin each other. The magnetic flux lines 34 indicated in FIG. 2 form accordingly.

Apart from this magnetically coded carrier member 30 which the rotational angle sensor 26 shares with the torque sensor, the rotational angle sensor 26 comprises a printed circuit board 36, an optional magnetic flux concentrator 38, and an application-specific integrated circuit 40 (referred to as ASIC below). The ASIC is an electronic circuit here, which has been realized as an integrated circuit according to individual requirements and which in the present case includes at least one GMR, AMR, or Hall sensor element 42.

The magnetic flux concentrator 38 is arranged between the printed circuit board 36 and the carrier member 30 and, as a rule, comprises at least one suitably shaped metal sheet to conduct the magnetic flux in the region of the ASIC 40 such that a sensor element 42 of the ASIC 40 can detect the variations in the magnetic flux upon a rotation of the carrier member 30.

Just like the ASIC 40, the magnetic flux concentrator 38 is mounted on the printed circuit board 36 and arranged in the sensor housing 28 together with the printed circuit board 36.

Figure 3:
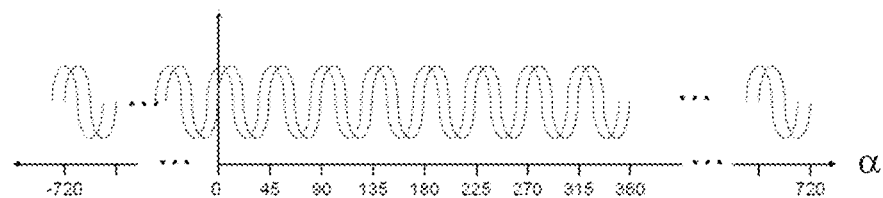
FIG. 3 shows a graph with sensor signals picked up.

The ASIC 40 includes, for example, two sensor units offset by 90 degrees, with FIG. 3 showing a graph in which the signal curves for a rotating carrier member 30 are plotted. Here, the absolute steering angle $\alpha$ was defined to be 0 degrees when traveling straight ahead, and, proceeding therefrom, a maximum steering angle of 720 degrees to the left and right was assumed by way of example.

Figure 4:
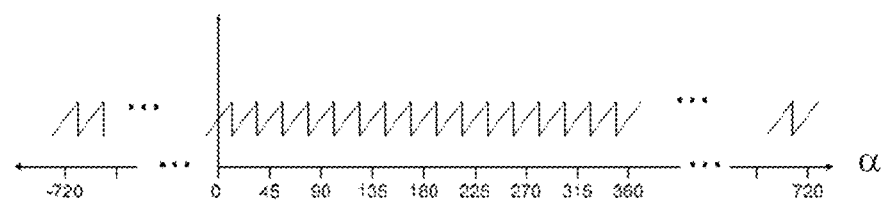
FIG. 4 shows a graph with sensor signals processed further.

The sine-shaped or cosine-shaped signal curves according to FIG. 3 can be further processed in the ASIC 40 by means of the arc tangent function and converted to a sawtooth-shaped signal profile according to FIG. 4.

The rotational angle sensor 26 includes a counting means 44 for detecting absolute angles $\alpha$ of rotation; these absolute angles of rotation may be in particular larger than 360 degrees.

Figure 6:
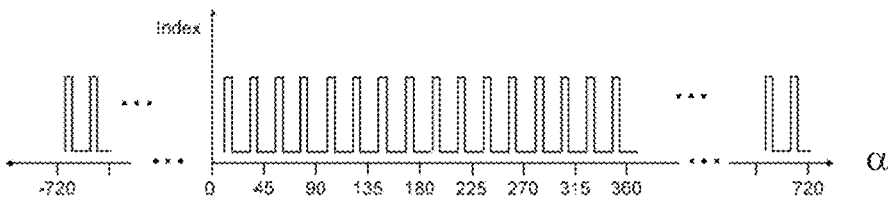
FIG. 6 shows a graph with an index function obtained from the sensor signals.

According to a first embodiment of the sensor assembly 24, the counting means 44 is connected to an electrical energy storage such as, for example, a vehicle battery. In this way, the counting means 44 is permanently energized even when the vehicle engine is off. As a result, the counting means 44 may be in the form of a simple counter in the ASIC 40. A corresponding counting or index function is illustrated by way of example in FIG. 6. This means that upon a rotation or turning of the carrier member 30, the number of angular segments (or pairs of poles) is counted which move past the rotational angle sensor. The sum of the angular segments counted then provides a conclusion to be drawn about an angle by which the steering wheel or the carrier member 30 has been rotated about its axis; such angle may also be larger than one complete turn, i.e. 360 degrees.

Figure 5:
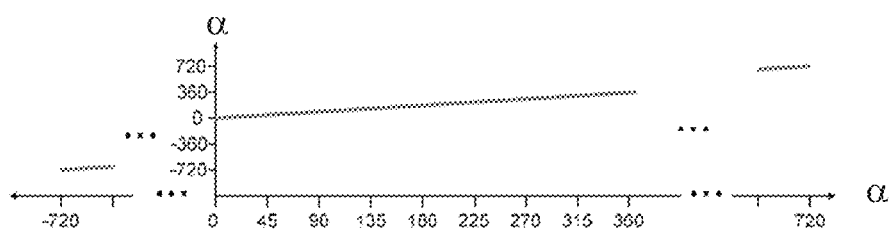
FIG. 5 shows a further graph with sensor signals processed further.

The values for an absolute steering angle $\alpha$ can then be established from the processed sensor signals either within the ASIC 40 or in a central electronic control unit. This is illustrated in the graph of FIG. 5.

In a second embodiment of the sensor assembly 24, the counting means 44 is configured such that it can detect and store a variation in the absolute steering angle $\alpha$ even in the de-energized condition. This offers the advantage that no separate electrical energy storage needs to be provided and the rotational angle sensor 26 does not put a load on the available vehicle battery.

Figure 7:
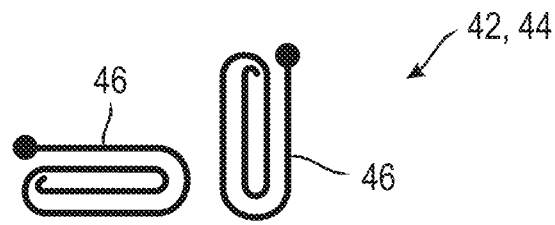
FIG. 7 shows a schematic diagram of a multiturn device.

FIG. 7 schematically shows an embodiment of the counting means 44 which is adapted to detect and store a variation in the absolute steering angle $\alpha$ even in the de-energized condition. The counting means 44, which is in the form of a magnetic counter, here comprises two GMR sensor elements 42 each of which has an n-fold spiral multilayer structure 46. So-called domain walls form in such multilayer structures 46.

Also, upon a rotation of the carrier member 30 there is a change in the magnetization in the multilayer structure 46 and in the resistivity of the multiturn device 44. Depending on the configuration of the counting means 44, a sum of angular segments can then be assigned to a particular resistivity, for example, from which a conclusion can be drawn about the specific number of turns. The resistivity may be retained here even in the de-energized condition of the counting means 44 and can be retrieved at any time by means of a current applied to the counting means 44.

In this context, the measuring range of the counting means 44 depends on the number of turns of the spiral multilayer structures 46.

Since counting means 44 of this type are, in principle, known from the prior art, the specific design and function thereof will not be discussed in greater detail. In this connection, reference is made, e.g., to DE 10 2004 020 149 A1 T2 and corresponding U.S. Pat. No. 7,671,583 B2, both of which are incorporated by reference herein in entirety, which describes the effect of the formation of domain walls in spirally arranged multilayer structures.

For a more precise detection of the absolute steering angle, the rotational angle sensor is designed to measure an angular range within an angular segment, i.e. in an angular range of a pair of poles. This measurement is based on the variation in the magnetic flux lines, which already appears in the case of small angles of rotation of the carrier member 30. The measurement within a respective angular segment is superimposed on, or combined with, the sum of angular segments counted, so that altogether an exact value of the absolute steering angle α is obtained. The superposition or combination of the measurement of the angular range within a particular angular segment with the sum of the counted angular segments for determining the absolute steering angle α may be carried out either in the ASIC 40 or in a central electronic control unit (not shown).

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A sensor assembly for motor vehicle steering systems comprising:
    a torque sensor for magnetically determining a steering torque, and
    a rotational angle sensor for magnetically determining an absolute steering angle,
    wherein only one carrier member is provided which has only a single magnetic coding for determining the steering torque and the absolute steering angle, the magnetic coding being shared by the torque sensor and the rotational angle sensor.

2. The sensor assembly according to claim 1, wherein the carrier member is a rotatable carrier wheel having a plurality of magnets arranged radially in pairs.

3. The sensor assembly according to claim 1, further including a printed circuit board having at least one GMR, AMR, or Hall sensor element mounted thereon.

4. The sensor assembly according to claim 3, wherein a magnetic flux concentrator is provided between the printed circuit board and the carrier member having a magnetic coding.

5. The sensor assembly according to claim 1, wherein the rotational angle sensor measures an angular range within an angular segment.

6. The sensor assembly according to claim 5, wherein the rotational angle sensor includes a counting means which counts a plurality of angular segments, the sum of the angular segments being combined with the angular range measured within an angular segment to determine the absolute steering angle therefrom.

7. The sensor assembly according to claim 6, wherein the counting means is connected to an electrical energy storage.

8. The sensor assembly according to claim 6, wherein the counting means detects and stores a variation in the absolute steering angle in the de-energized condition.

* * * * *